(12) United States Patent
Till

(10) Patent No.: US 11,771,078 B1
(45) Date of Patent: Oct. 3, 2023

(54) HUNTING METHOD

(71) Applicant: Michael Till, Newark, DE (US)

(72) Inventor: Michael Till, Newark, DE (US)

(*) Notice: Subject to any disclaimer, the term of this patent is extended or adjusted under 35 U.S.C. 154(b) by 0 days.

(21) Appl. No.: 17/398,660

(22) Filed: Aug. 10, 2021

Related U.S. Application Data

(60) Provisional application No. 63/065,098, filed on Aug. 13, 2020.

(51) Int. Cl.
*A01M 31/00* (2006.01)

(52) U.S. Cl.
CPC .................. *A01M 31/008* (2013.01)

(58) Field of Classification Search
CPC ........ A01M 11/00; A01M 31/00; A01K 29/00
See application file for complete search history.

(56) References Cited

U.S. PATENT DOCUMENTS 8,468,973 B2* 6/2013 Sasano .................. A01K 23/00
119/171

2004/0265265 A1* 12/2004 Schneider ................. A61L 9/01
424/76.2
2009/0096261 A1* 4/2009 Abraham ............... A47C 31/11
297/228.1

OTHER PUBLICATIONS

Tingley's Northland Hunting, How To . . . , Mar. 27, 2017 (Year: 2017).*

* cited by examiner

*Primary Examiner* — Joshua J Michener
*Assistant Examiner* — Henry Hooper Mudd
(74) *Attorney, Agent, or Firm* — Devlin Law Firm LLC

(57) ABSTRACT

A hunting method utilizes a scent blocker to block the scent mark of a mating male animal, such as a hooved animal including a buck, to cause the male animal to investigate the scent mark area to remark their scent mark. Often times a buck will rub their antlers on a tree with their antlers to produce a tree rub and then leave a scent mark in a scrape under the tree. They will then wait in an area downwind and if they detect a female scent or if their own scent mark is not detected, they may will revisit the location for investigation. A scent blocker may be applied to or over the scent mark and may be an absorptive scent blocker, a chemically reactive scent blocker, a masking scent blocker, a blocking scent blocker that is substantially non-permeable, or any combination thereof.

14 Claims, 7 Drawing Sheets

HUNTING METHOD

CROSS REFERENCE TO RELATED APPLICATIONS

This application claims the benefit of priority to U.S. provisional patent application No. 63/065,098, filed on Aug. 13, 2020, the entirety of which is hereby incorporated by reference herein.

BACKGROUND OF THE INVENTION

Field of the Invention

The invention relates to a hunting method of using a scent blocker to block the scent, such as a mating scent of a male animal, to lure the male animal back to this location to re-scent the area.

Background

Many hunters use scent blockers to block their own scent, as an animal may be spooked by the smell of a human and may avoid the area. Other hunters use attractive scents, called lure scent to attract animals to an area. A lure scent may be that of food which may be the scent of a prey animal for predators or may be fruits or vegetation. These food lures are marginally successful as an animal may not be hungry or may have plenty of food in other areas. A lure may be a curiosity lure, such as a scent that is not typical for the area, such as a fish scent to attract a fox or other predator. A lure may be a glandular lure scent such as a glandular scent of a female deer in estrus, (ready to mate), which is used to drive buck to the lure scent.

During rutting season, male animals will often produce a scent mark to attract potential mates. A buck will rub their rack on a tree to produce a tree mark or tree rub on the tree and will then create a scent mark in a scrape under the tree or shrub. The scent mark left in the scrape under the tree may include a glandular secretion from the tarsal gland located on the buck's leg and may also include urine. A buck will often rub a preorbital gland, located under their eye, on a tree branch to create an additional scent marking in this location to attract a doe. The buck will then bed down in an area downwind of this scent mark. The doe will alert the buck that they are interested in mating by leaving her scent in the area. A buck may come back to this area if they smell the doe scent or to re-mark the area if their scent is not detected.

A lure station may be set up by putting a lure scent on a hanging item from a tree limb or on a post extending up from the ground. Having the lure scent elevated may help the scent be carried by wind.

SUMMARY OF THE INVENTION

The invention is directed to a hunting method that utilizes a scent blocker to block the scent mark of a mating male animal, such as a hooved animal including a buck, to investigate the scent mark area to remark their scent mark. Often times a buck will rub a tree with their antlers and then leave a scent mark in a scrape under the tree or shrub. They will then wait in an area downwind and if they detect a female scent or if their own scent mark is not detected, they may will revisit the location for investigation.

The hunting method of the present invention involves finding a scent mark of a male animal and then blocking this scent with a scent blocker to lure the male animal back for investigation as to why the scent is not detected and to remark the area. This is when the hunter waiting nearby can shoot the animal. A scent blocker may be applied to the scent mark, such as by applying scent blocker powder or scent blocker fluid over the scent mark, such as on and in the scrape. In some cases, in may be more effective to turn the ground over in the scent mark, thereby getting better scent blocking as the scent blocker is mixed with the ground of the scent mark and scrape. The scent blocker may be initially applied to the scent mark and then the ground may be turned over before an additional scent blocker is applied. An additional amount of scent blocker may be applied after the ground in turned and the scent blocker is mixed with ground. In addition, a scent blocker mat may be applied over a scent mark or over a turned over ground area of a scent mark which may have the powder or fluid scent blocker applied thereto.

A scent blocker may be absorptive compound that absorbs the scent of a male animal. An absorptive compound includes, but is not limited to, silica containing compounds, silica, silica dioxide or silica gel, carbon containing compounds and carbon or activated carbon, molecular sieves including zeolites and any combination thereof. An absorptive scent blocker may be a molecular sieve that has specifically designed pores to absorb and trap the male scent or portions of the male scent.

A scent blocker may be a chemically reactive scent blocker that has chemically reactive compounds that react with chemicals or compounds of the male scent, such as ammonia. For example, hydrogen sulfide can be reacted with amines to reduce a rotten egg smell.

A chemical may be included in the scent blocker to mask the scent or to change the scent to reduce and/or eliminate detection of the original scent mark. A scent blocker may be a masking scent blocker, or a compound that masks the male scent. A masking scent may not be a lure scent or a food scent, rather it may be a natural flora scent, for example.

A scent blocker mat may be planar piece of material or fabric that is configured to cover the scent mark. A scent blocker may include a scent blocker compound that is absorptive scent blocker, chemically reactive scent blocker, or masking scent blocker. A scent blocker may be substantially non-permeable, wherein the Gurley time, as determined with a Gurley Densometer, model 4340, Gurley Precision Instruments, Troy N.Y., is more than 100 seconds. A scent blocker may be non-permeable and comprise a solid film of material, such as plastic. A substantially non-permeable scent blocker mat or non-permeable scent blocker mat may be considered a blocking scent blocker, as it blocks or traps the male scent of the scent mark.

In an exemplary embodiment, two or more types of scent blocker are used and are selected from absorptive scent blocker, a chemically reactive scent blocker, a masking scent blocker, and a blocking scent blocker. For an example, a chemically reactive scent blocker fluid may be applied to the ground of a scent mark and the ground may be turned over to produce a blocked scent mark and then a scent blocker mat that has an absorptive sent blocker, thereon is applied over the turned over ground with the scent blocker.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
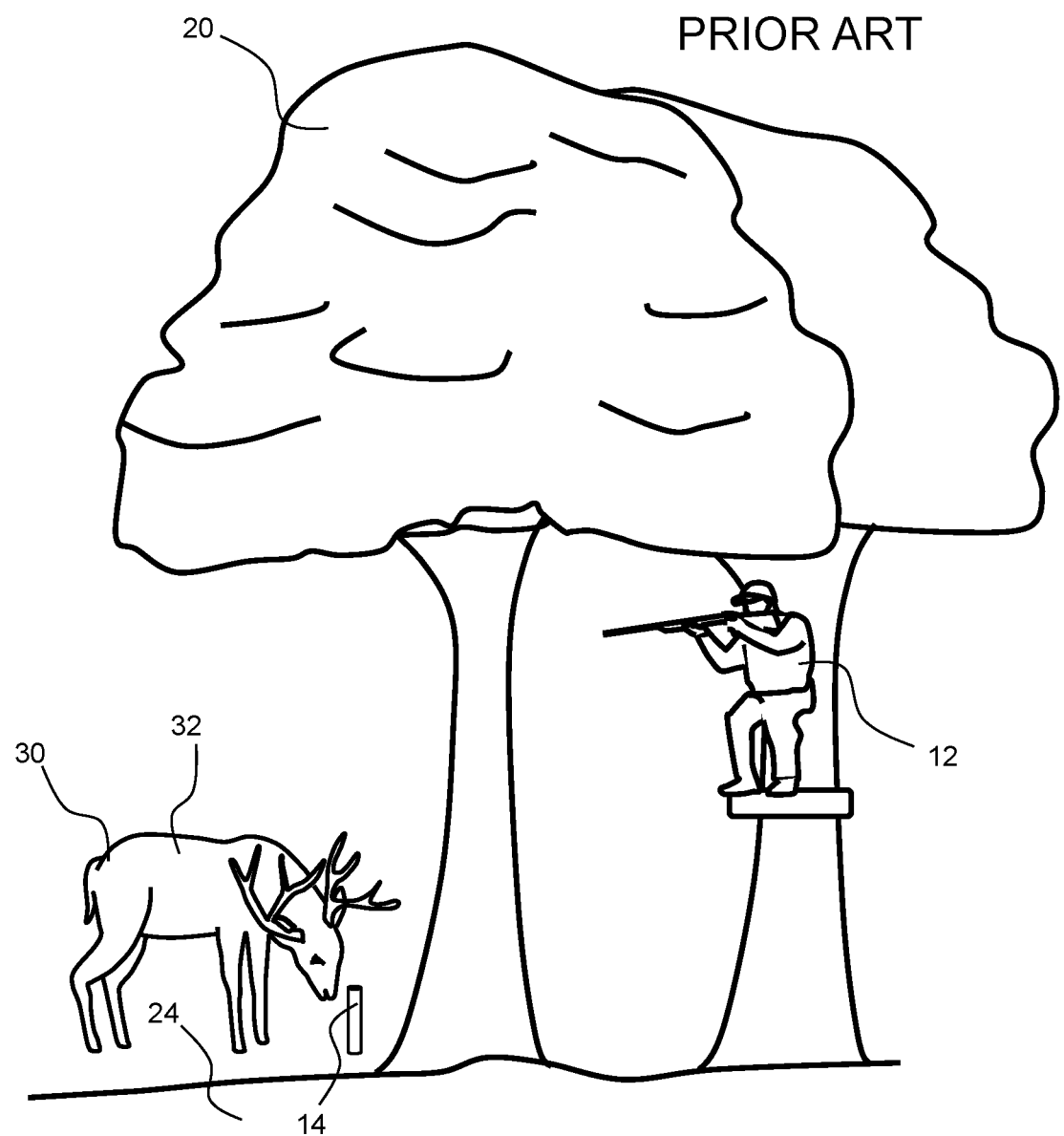
FIG. 1 shows a diagram of a hunting method wherein the hunter has produced a lure scent by placing a lure scent on a post and placed the post in the ground.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a hunting method includes a hunter producing a lure scent 14 by placing a lure scent on a post and placed the post in the ground 24. The buck 32, a male animal 30, has been attracted to the area by the lure scent and the hunter 12 is waiting in tree stand in the tree 20 nearby to take the shot.

Figure 2:
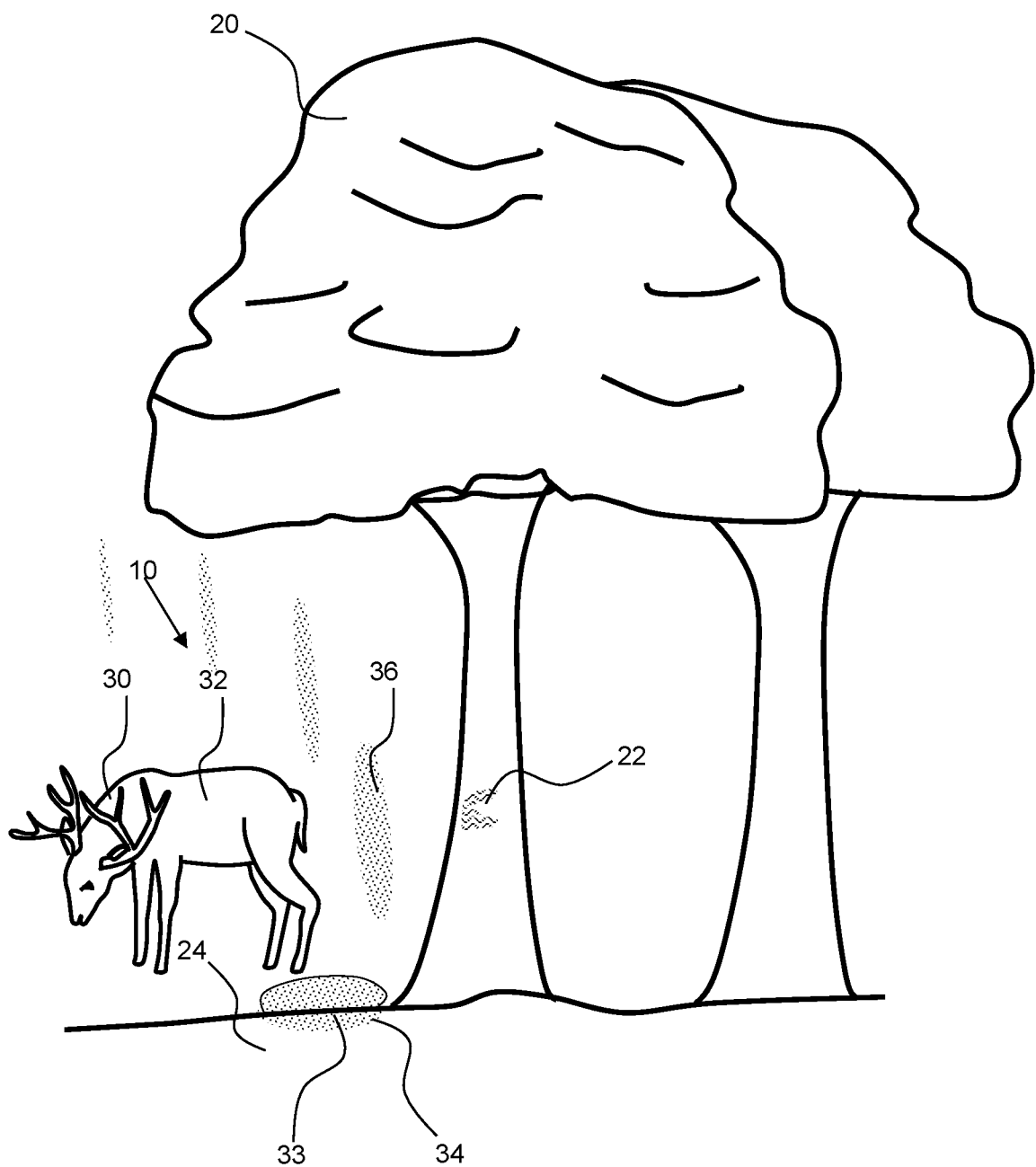
FIG. 2 shows a diagram of a buck producing a scent mark in a scrape next to a tree that has a tree rub from the buck rubbing their antlers on the tree.

As shown in FIG. 2, a male animal 30, a buck 32 has produced a tree rub 22 on the trunk of the tree 20 and a scent mark 34 in a scrape 33, which may include urine of musk on the ground 24. The scent mark produces a female lure scent 36 that rises from the scent mark and is carried by the wind to attract a female.

Figure 3:
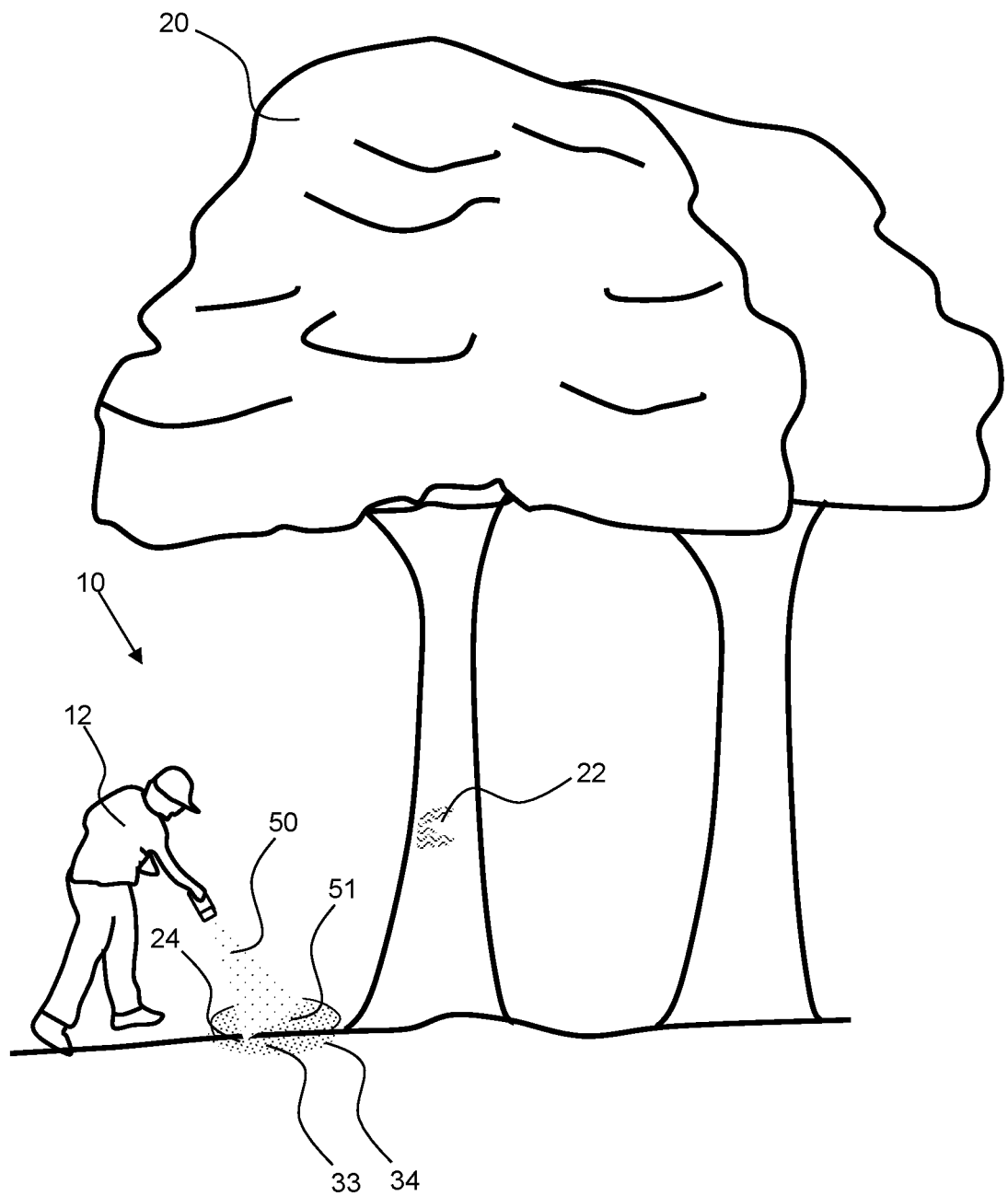
FIG. 3 shows a diagram of an exemplary hunting method of the present invention, wherein the hunter blocks the scent mark shown in FIG. 2, with a scent blocker; the hunter is spreading scent blocker over the scrape and the scent mark.
Figure 4:
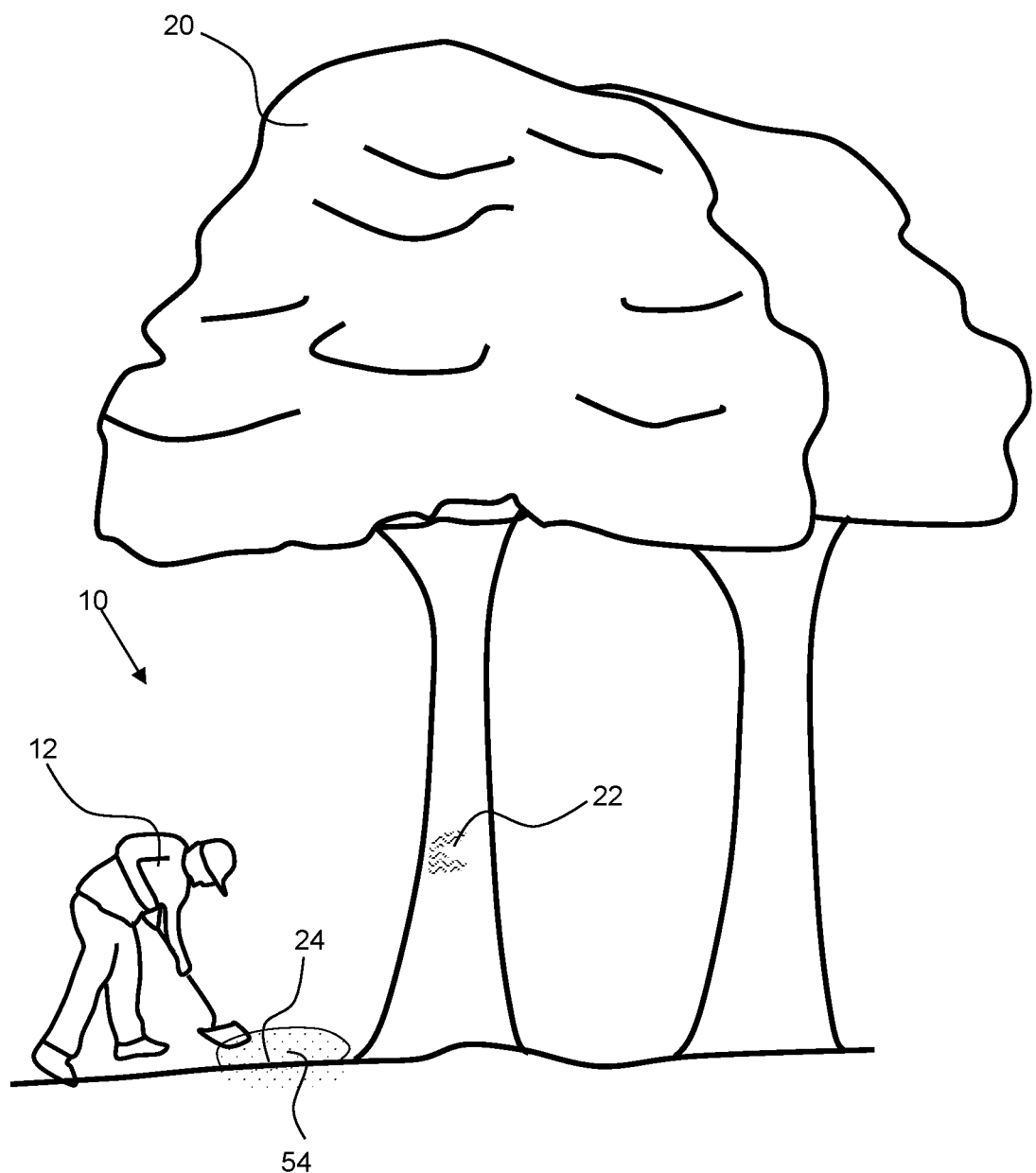
FIG. 4 shows a diagram of an exemplary hunting method wherein the hunter turns-over the ground of the scrape with scent blocker to effectively block the scent mark.
Figure 5:
FIG. 5 shows a diagram of an exemplary hunting method, wherein the scent mark of a male animal is blocked with a scent blocker to produced a blocked scent mark and wherein the male animal has come to investigate why their scent was not detected.

Referring now to FIGS. 3 to 5, an exemplary hunting method 10 of the present invention, includes using a scent blocker to effectively block the scent of a scent mark 34 of a male animal, such as a buck. As shown in FIG. 3, the hunter has found the tree rub 22 on the tree 20 trunk indicating that there is a scrape 33, and a scent mark 34. The hunter then blocks the scent mark 34 with a scent blocker 50, such as a powder, fluid, mat or combination thereof. The hunter may use a first scent blocker 50 and a second scent blocker 51. As shown in FIG. 4, the hunter turns-over the ground with scent blocker 50 to effectively block the scent mark and produced a blocked scent mark 54. A first type of scent blocker may be chemically reactive scent blocker initially and this may react with the urine and glandular secretions of the buck as the ground is mixed. A hunter may then apply a second type of scent blocker, a masking scent blocker over the area after the ground is mixed with the first scent blocker. Using two types of scent blocker may be more effective. Also note that a single application of a scent blocker may include two or more types of scent blockers as described herein. As shown in FIG. 5, the buck 32 has come to the blocked scent mark 54 to investigate why their scent was not detected and to re-scent the area. The hunter 12 is waiting in a nearby tree stand to take a shot at the buck when he investigates.

Figure 6:
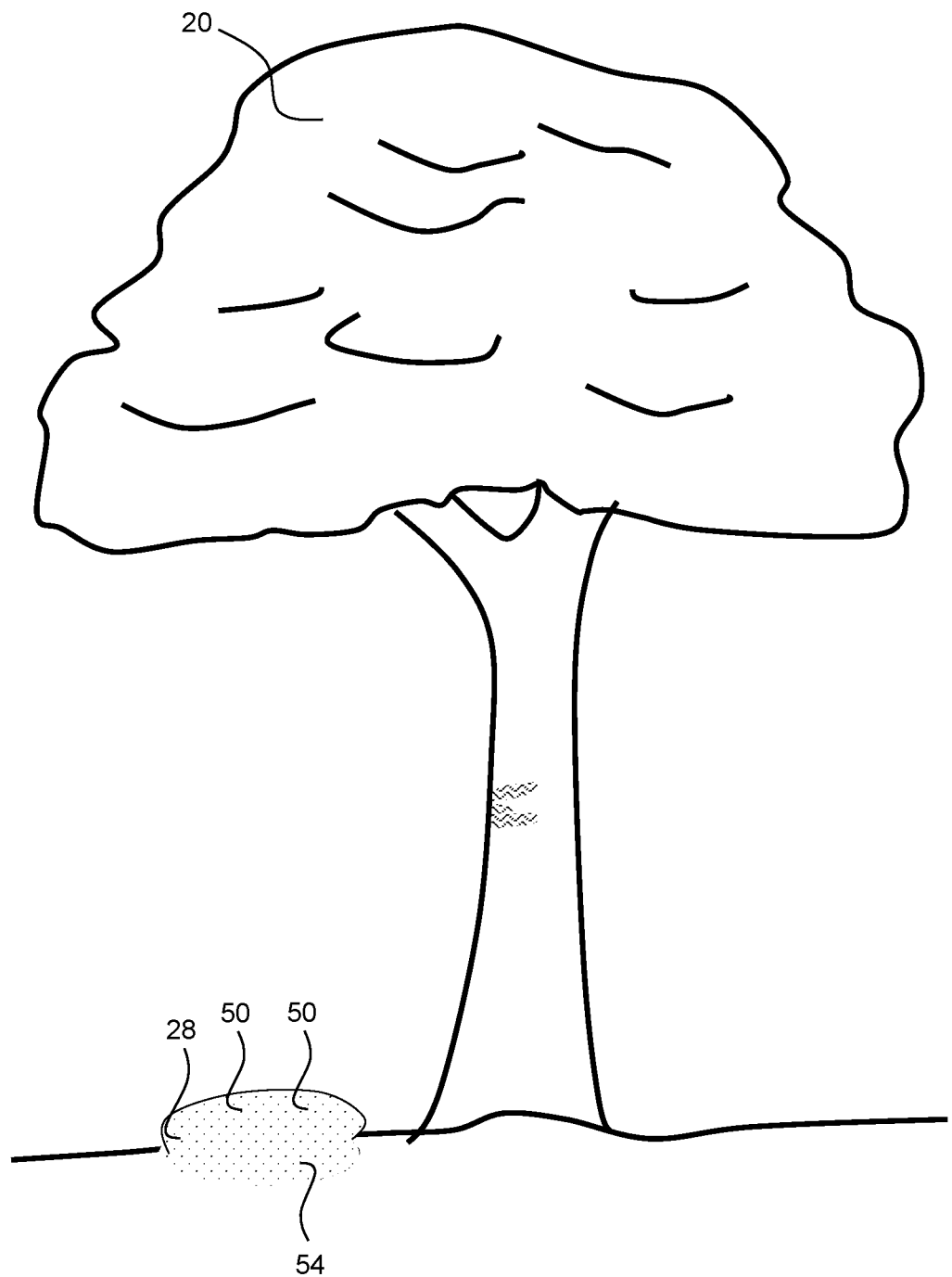
FIG. 6 shows an exemplary blocked scent mark comprising scent blocker mixed with the ground of the scrape and turned over ground with the scent blocker therein.
Figure 7:
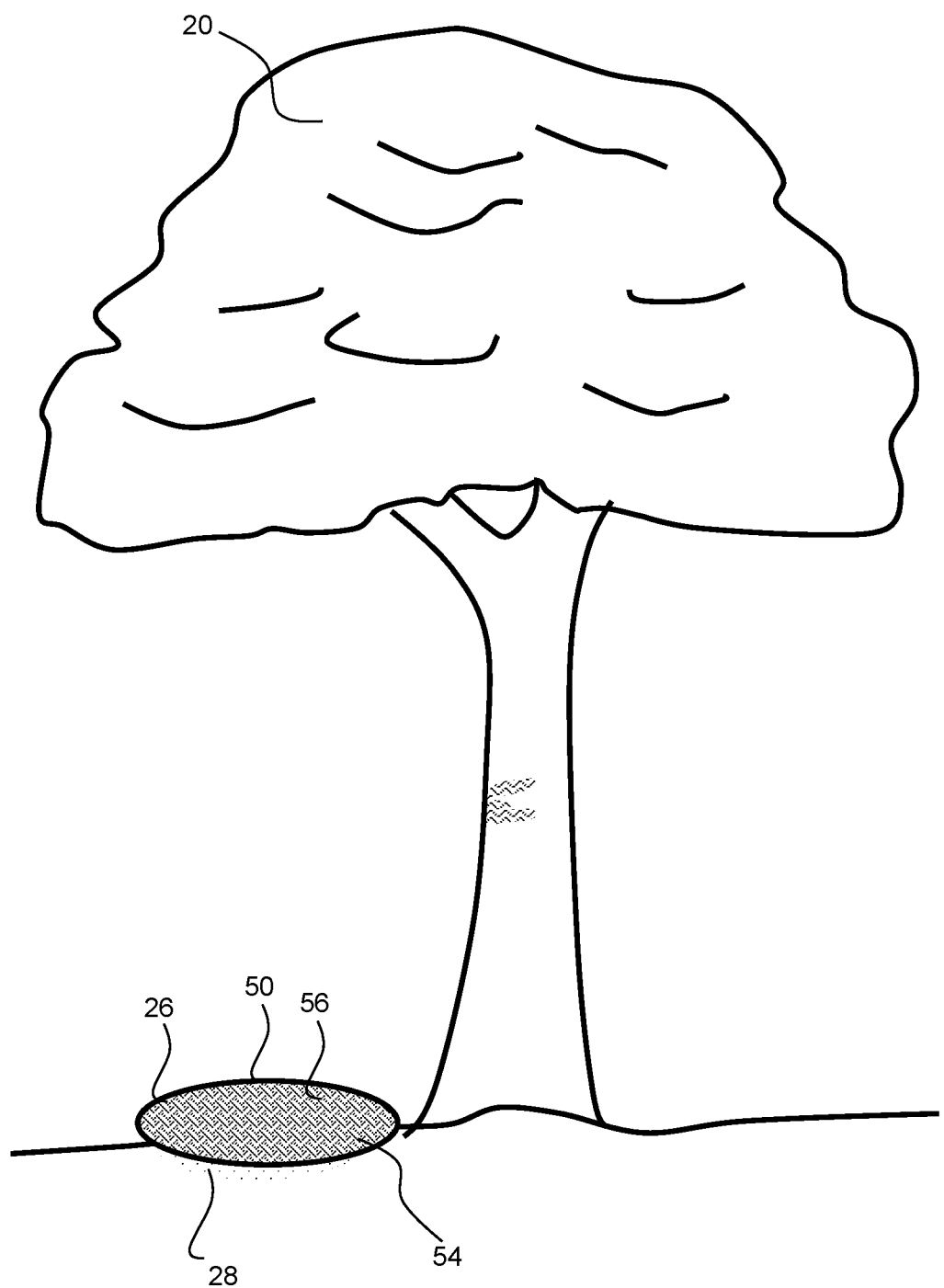
FIG. 7 shows an exemplary blocked scent mark comprising scent blocker mixed with the ground of the scrape and turned over ground with the scent blocker therein as well as a scent blocker mat over the ground.

Referring now to FIG. 6 an exemplary blocked scent mark 54 comprises a scent blocker 50 mixed with the ground, such as ground in and around a scrape area, and turned over ground with the scent blocker therein. As shown in FIG. 7, the exemplary blocked scent mark 54 comprises a scent blocker 50 mixed with the ground and the ground turned over to produce turned over ground 28 with the scent blocker therein. Also, a scent blocker mat 56 is configured over the scent mark to produce a blocked scent mark with two types of scent blocker. As described herein, a scent blocker mat may be a material that has additional scent blocker thereon and may be a low or impermeable material that can prevent the animal scent from the scent mark from permeating therethrough. The scent blocker mat may be covered with non-scent marked earth 26, such as dirt and leaves from a nearby location.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of hunting comprising:
   a) providing a scent blocker;
   b) locating a scent mark having a male scent of a male animal;

c) applying said scent blocker to the scent mark to produce a blocked scent mark having a reduced male scent;
   wherein the scent blocker is selected from the group consisting of an absorptive scent blocker, a chemical reactive scent blocker and a blocking scent blocker;
      wherein the absorptive scent blocker is an absorptive compound that absorbs the male scent,
      wherein the chemical reactive scent blocker is a chemically reactive compound that reacts with compounds of the male scent to reduce the male scent; and
      wherein the blocking scent blocker is a piece of material that is non-permeable having a Gurley time of more than 100 seconds and configured for placement over the scent mark to reduce the male scent;
d) luring said male animal back to the blocked scent mark by the reduction of the male scent; and
e) waiting proximal to the blocked scent mark for said male animal to return to the blocked scent mark for shooting at said male animal.

2. The method of hunting of claim 1, wherein the absorptive compound is a powder.

3. The method of hunting of claim 1, wherein the absorptive compound is a fluid.

4. The method of hunting of claim 1, wherein the blocking scent blocker comprises a scent blocker mat that is applied over the scent mark.

5. The method of hunting of claim 4, wherein the scent blocker mat comprises an absorptive compound.

6. The method of hunting of claim 5, wherein the scent blocker mat is a film of material.

7. The method of hunting of claim 1, wherein the chemically reactive compound comprises a powder.

8. The method of hunting of claim 1, wherein the chemically reactive compound is a fluid.

9. The method of hunting of claim 1, wherein the absorptive compound is a molecular sieve that has pores to absorb and trap the male scent.

10. The method of hunting of claim 1, wherein the scent blocker comprises at least two scent blockers selected from said group consisting of: said absorptive scent blocker, said chemically reactive scent blocker, and said blocking scent blocker.

11. The method of hunting of claim 1, wherein the scent blocker comprises an absorptive scent blocker and a scent blocker mat configured over a blocked scent mark comprising said absorptive scent blocker.

12. The method of hunting of claim 1, wherein the scent blocker comprises a chemically reactive scent blocker and a scent blocker mat configured over a blocked scent mark comprising said chemically reactive scent blocker.

13. The method of hunting of claim 1, wherein the scent mark is in a ground and further comprising turning the ground with the scent blocker applied to produce said blocked scent mark.

14. The method of hunting of claim 13, further providing a scent blocker mat and further applying a scent blocker mat over the blocked scent mark.

* * * * *